Patented Apr. 3, 1934

1,953,607

UNITED STATES PATENT OFFICE 1,953,607

METHOD OF RECOVERING CAROTENE FROM GREEN LEAFY PLANT MATERIALS

Harry N. Holmes, Oberlin, Ohio, and Henry M. Leicester, San Francisco, Calif., assignors, by direct and mesne assignments, to S. M. A. Corporation, Cleveland, Ohio, a corporation of Ohio No Drawing. Application July 31, 1931, Serial No. 554,375

6 Claims. (Cl. 260—167)

This invention relates to the recovery or extraction of carotene from plants or vegetables, and more particularly to its recovery from green, leafy plant material containing carotene mixed with green chlorophyll and/or xanthophyll, the so-called plant pigments. Carotene is a valuable plant constituent, by reason of the fact that research indicates that in the animal body it is converted into the valuable and desirable vitamin A. It occurs in many plants and in varying quantities. It is a constituent in carrots and is largely responsible for their color and may be recovered commercially therefrom. However, certain of the green, leafy plant materials also contain appreciable quantities of carotene, but its recovery therefrom involves problems additional to those encountered in its removal from carrots and like material, due to the necessity of greatly reducing the water content without serious loss of carotene by oxidation (as occurs in air drying) as well as the problem of getting rid of chlorophyll, xanthophyll and other plant pigments and materials.

The present invention has for its object to provide an improved method of recovering carotene from such green, leafy plant materials in maximum quantities and without material loss, and by a method which may be performed conveniently and at relatively low cost and in a manner to produce either a crude or a substantially pure product, as desired.

Merely for purposes of illustration and not in any sense of limitation, the invention will be described with reference to the recovery of carotene from spinach, although alfalfa or other green leafy plant materials containing worthwhile quantities of carotene are to be considered in the same class and may be handled in the same manner about to be described.

According to our method, the spinach, raw and undried, is first cooked thoroughly with exclusion of air to prevent oxidation of carotene, such as occurs when these plant materials are dried by air, which method of drying heretofore has so largely prevented carotene recovery from such materials by economic processes. The cooking may be of the same character practiced in ordinary canning factories, in a bath of steam or in steam heated water, or with the spinach or other material sealed in containers and subjected to heat, or, our process may be performed with spinach previously cooked without access of air and then preserved in sealed containers. It is therefore possible by our method to harvest and cook the spinach when its carotene content is a maximum, leaving subsequent treatment to a later time, or, the spinach may be cooked out of contact with the air and following steps may be proceeded with immediately, or again, as in cases where the crop is too large to handle at once, the spinach may be cooked and sealed and set aside in crude form ready for processing when convenient. Canned spinach, alfalfa or other green, leafy material purchased in the open market, may also be employed if the material has been cooked and preserved out of contact with the air.

The cooking process disintegrates the fibre and makes the leafy material more compact for handling. The cooked spinach or other material, preferably drained from excess water, is covered with a dilute alkaline solution at ordinary room temperature, such as a solution of dilute sodium hydroxide, or even the more expensive potassium hydrate, of approximately 3N concentration, although the exact concentration is immaterial. After standing a few hours or longer, preferably with exclusion of air, the cellulose becomes disintegrated and the chlorophyll hydrolyzes to form water soluble products which are easily separated. However, the carotene is not materially injured or changed by this alkali treatment.

The pasty mixture is next diluted with water, preferably about an equal volume, and the whole mass is gently stirred with chloroform, which extracts or dissolves the carotene as well as the xanthophyll, but no chlorophyll. Care is taken not to agitate the water and plant material while mixed with chloroform to such an extent that troublesome emulsions result.

The heavy and red solution of plant pigments in chloroform settles as a layer on standing and is easily drawn off. The watery plant material is again extracted with chloroform and the pigment solution thus formed is allowed to settle and is again drawn off and successive chloroform washings are continued until no worthwhile additional amounts of carotene are dissolved.

The several chloroform solutions are next mixed and are distilled to yield an orange colored mass of crude carotene, xanthophyll and some fatty material. Of course, this rich concentrate is a crude form of carotene, contaminated by other substances, but it is useful in this form and may be so used directly for animal feeding or for other purposes. However, if a pure or more pure product is desirable, the crude product is dissolved in petroleum ether in suitable quantities, the resulting solution of pigments being agitated with methyl alcohol of approximately 80% to 90% concentration. In the petroleum ether solution the methyl alcohol dissolves the xanthophyll but not the carotene and the mixture settles or stratifies by gravity with the methyl alcohol and its contained xanthophyll in one layer and the carotene in its petroleum ether solvent in another layer, and the two layers are readily separated.

By distillaton, of course, a more pure carotene, now free of xanthophyll, may readily be separated, but to further purify it the petroleum ether solution, containing the carotene, has added thereto a suitable proportion of absolute ethyl alcohol, which coagulates and settles or precipitates certain fatty materials present in these plant substances. The fatty material is removed by filtration and the filtrate containing the carotene is concentrated by evaporation at reduced pressure, but to a point short of separation of carotene as a solid. The concentrated solution, preferably in an atmosphere of nitrogen, as in a flask, is then cooled and is held for an appreciable time at a suitable low temperature, for example, approximately 32° F., until the carotene crystallizes out as small dark red lustrous crystals whose solubility in the mixture is reduced by the presence of the alcohol.

While in our process we prefer to employ cooked leafy plant material, that is to say, plant material cooked with the exclusion of air, nevertheless this is not essential and the raw uncooked leafy material, macerated or not as desired, may be immediately treated with alkali in the manner and for the purpose before stated.

The present method includes a number of advantages over prior methods for the same purpose. It may be practiced with raw or cooked plant material and its practice with cooked material enables the crop to be harvested and cooked when the carotene content is a maximum and then preserved for later recovery when convenient, or a part of the crop may be held back when it is inconvenient to treat it all at once. Throughout the process care is taken to avoid access of air, so that the consequent loss of carotene by oxidation is largely prevented or overcome. The method also provides for separation of chlorophyll, xanthophyll and other green plant pigments and secures a substantially pure product.

What we claim is:

1. The method of recovering carotene from green leafy plant materials, consisting in treatng the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, and recovering the carotene therefrom.

2. The method of recovering carotene from green leafy plant materials, consisting in treating the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, and recovering the carotene therefrom by crystallization.

3. The method of recovering carotene from green leafy plant materials, consisting in treating the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, distilling the same to leave a mass of crude carotene containing pigment material, dissolving the crude carotene in a solvent therefor, precipitating fatty matter by the addition of alcohol and removing such matter, concentrating the remaining solution, and recovering carotene therefrom.

4. The method of recovering carotene from spinach, consisting in treating the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, distilling the same to leave a mass of crude carotene containing pigment material, dissolving the crude carotene in a solvent therefor, precipitating fatty matter by the addition of alcohol and removing such matter, concentrating the remaining solution, and recovering carotene therefrom by crystallization.

5. The method of recovering carotene from green leafy plant materials, consisting in treating the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, distilling the same to leave a mass of crude carotene containing pigment material, dissolving the crude carotene in petroleum ether, adding an alcohol to dissolve xanthophyll, settling and thereby stratifying the mixture and separating the petroleum ether solution of carotene, and recovering carotene therefrom.

6. The method of recovering carotene from green leafy plant materials, consisting in treating the same with an alkaline solution to disintegrate the cellulose and hydrolize the chlorophyll, adding chloroform and mixing the same with said solution to dissolve the carotene and the xanthophyll, settling to collect a chloroform layer containing the carotene and other dissolved substances, separating the chloroform solution, distilling the same to leave a mass of crude carotene containing pigment material, dissolving the crude carotene in petroleum ether, adding an alcohol to dissolve xanthophyll, settling and thereby stratifying the mixture and separating the petroleum ether solution of carotene, adding absolute alcohol to precipitate fatty material, filtering and recovering carotene from the filtrate.

HARRY N. HOLMES.
HENRY M. LEICESTER.